Figure 1:
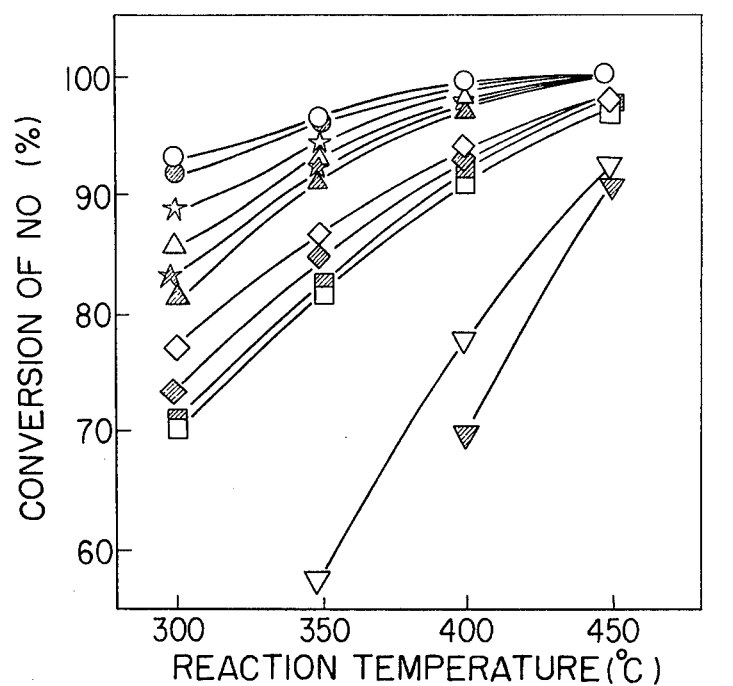

United States Patent [19]

Nishida et al.

[11] 4,119,568

[45] Oct. 10, 1978

[54] SOLID SUPPORTED CATALYSTS FOR CATALYTIC REDUCTION OF NITROGEN OXIDES IN WASTE GASES

[75] Inventors: Fusao Nishida, Tokyo; Hiroo Matsuoka, Ebina; Tomiaki Yamada, Yokohama; Goro Sato, Kitakyushu, all of Japan

[73] Assignee: Japan Gasoline Company, Ltd., Tokyo, Japan

[21] Appl. No.: 644,462

[22] Filed: Dec. 24, 1975

[30] Foreign Application Priority Data

Dec. 28, 1974 [JP] Japan ................................ 50-2092

[51] Int. Cl.$^2$ ......................... B01J 27/02; B01J 27/18
[52] U.S. Cl. .................................. 252/437; 252/439; 252/440; 252/455 R; 252/463; 423/239
[58] Field of Search ............... 252/440, 439, 463, 435, 252/437; 423/239

[56] References Cited

U.S. PATENT DOCUMENTS

| | | | |
|---|---|---|---|
| 2,206,377 | 7/1940 | Weiss | 252/440 |
| 2,423,612 | 7/1947 | Mulligan et al. | 252/440 X |
| 2,952,644 | 9/1960 | Holden | 252/463 X |
| 3,353,910 | 11/1967 | Cornelius et al. | 252/463 X |
| 3,544,264 | 12/1970 | Hardison | 423/239 |
| 3,544,534 | 12/1970 | Kadowski et al. | 252/440 X |
| 3,864,451 | 2/1975 | Lee et al. | 423/239 |

FOREIGN PATENT DOCUMENTS 4,948,590  5/1974  Japan ...................................... 423/239

*Primary Examiner*—W. J. Shine
*Attorney, Agent, or Firm*—Cooper, Dunham, Clark, Griffin & Moran

[57] ABSTRACT

Solid supported catalysts for catalytic reduction of nitrogen oxide in waste gases utilizing ammonia as the reducing agent, the catalyst comprising at least one metallic oxide, sulfate or phosphate of a first transition metal supported on an alumina or silica-alumina carrier; the carrier containing from 0.03 to 20% by weight sulfur, based on the weight of the carrier, calculated as a sulfate or sulfite radical.

14 Claims, 3 Drawing Figures

SOLID SUPPORTED CATALYSTS FOR CATALYTIC REDUCTION OF NITROGEN OXIDES IN WASTE GASES

BACKGROUND OF THE INVENTION

This invention relates to novel catalysts for the catalytic reduction of nitrogen oxides in waste gases which may additionally contain sulfur oxides. It relates also to methods of preparing the novel catalysts.

Previously known procedures for reducing waste oxides of nitrogen to nitrogen have been categorized as either wet or dry. The dry process may be catalytic oxidation, decompositions or reduction, or it may be the adsorption process. Catalytic reduction may be selective or non-selective, depending upon whether the reducing agent concurrently reacts with oxygen and the nitrogen oxides. The catalysts of this invention are useful in selective reduction utilizing ammonia as the reducing agent.

It is known that metals of the platinum group, or a metal or metal oxide selected from Ib, Vb, VIb, VIIb, and VIII group of the periodic table supported on inorganic porous carriers such as alumina, silica-alumina, silica, diatomaceous earth and the like were employed as selective reducing catalysts in the prior nitrogen oxide (NOx) removal processes using $NH_3$ as the reducing agent. However, sulfur oxides (SOx) which often coexist with nitrogen oxides in waste gas are known to poison such catalysts so that their useful life is reduced. This problem becomes a factor at sulfur oxide concentrations as low as 1 to 10 ppm.

As ordinary flue gas normally contains 10 to 3,000 ppm sulfur oxides, the art has long sought to develop a catalyst which is resistant to poisoning by such oxides in order to carry out the nitrogen oxide removal process by catalytic reduction on an industrial scale.

Since oxygen is also usually present in waste gases, it is important that the catalyst selectively catalyze the reduction of nitrogen oxides rather than the reduction of oxygen. The reduction of oxygen is an exothermic reaction. If this reaction takes place to an appreciable extent, it becomes necessary to utilize special cooling devices and techniques which markedly increase the cost of the operation. Accordingly, another desideratum of catalysts for the selective reduction of nitrogen oxides in flue gases using ammonia as the reducing agent is that they efficiently catalyze the reaction of ammonia with nitrogen oxides, but not enhance the reaction of ammonia with oxygen.

SUMMARY OF THE INVENTION

Novel catalysts have now been discovered which effectively catalyze the selective reduction of nitrogen oxides in waste gas streams, withstand the poisoning by sulfur oxides, have a long life in industrial use and do not enhance the reaction between ammonia and oxygen.

The novel catalysts comprise an alumina or silica-alumina carrier supporting at least one metallic compound of a first transition metal. The carrier is characterized by the presence of from 0.03 to 20% by weight sulfur, based on the weight of the carrier, and calculated as a sulfate or sulfite radical. The presently preferred compounds are oxides, sulfates, and phosphates of metals of Groups Ib, Vb, VIb and VIII of the periodic table of the elements.

The catalysts of the present invention are prepared by initially forming an alumina or silica-alumina carrier containing the above described amounts of sulfur as a sulfate and/or sulfite radical and thereafter supporting the metal salt or salts on the carrier in accordance with known procedures. The products thus produced are dried at 100° to 150° C for 0.5 to 24 hours and thereafter calcined in a stream of air at 300° to 600° C for 1 to 10 hours. The stream of air is not necessary when organic substances are not present.

The carriers for use in the invention are prepared by any of the following procedures.

1. Powdered alumina or silica-alumina is added to an aqueous solution of aluminum sulfate, sulfuric acid, ammonium sulfate, ammonium sulfite or mixture thereof. The mixture is then kneaded, molded to the desired shape, dried at 100° to 150° C for 0.5 to 24 hours and calcined in a stream of air at 300° to 600° C for 1 to 10 hours.

2. An aqueous solution of sodium aluminate is added to an aqueous solution of aluminum sulfate, sulfuric acid, ammonium sulfate, and/or ammonium sulfite to produce a hydrogen of alumina. The hydrogel is then sequentially subjected to the steps of dehydration, drying, pulverizing, into fine particles, washing until the desired amount of sulfate and/or sulfite remains on the carrier, drying at 100° to 150° C for 0.5 to 24 hours and calcining in a stream of air at 300° to 600° C for 1 to 10 hours.

3. Sodium silicate and sulfuric acid are mixed to form a hydrogel of silica. The hydrogel is mixed with an aqueous solution of aluminate sulfate or an aqueous solution of sodium aluminate and an aqueous solution of sulfuric acid, ammonium sulfate and/or ammonium sulfite. Aqueous ammonia is then added to form a hydrogel of silica-alumina. The hydrogel is then treated as in process 2 to produce a silica-alumina carrier.

4. An alumina or silica-alumina carrier is impregnated with an aqueous solution of aluminum sulfate, sulfuric acid, ammonium sulfate and/or ammonium sulfite. The impregnated material is then dried at 100° C to 150° C for 0.5 to 24 hours and calcined in a stream of air at 300° to 600° C for 1 to 10 hours.

The carrier, as aforesaid, can be prepared as described above by methods which involve the actual preparation of the alumina or the silica-alumina support together with the sulfate and/or sulfite radical, or by methods in which the already formed support, which may be obtained commercially, is treated to contain the said radical or radicals. In either event the carrier will have a specific surface area of at least 50 m$^2$/g, a pore volume of from 0.5 to 1.5 cc/g and high mechanical strength. The concentration of sulfur calculated as a sulfate or sulfite radical in and on the carrier, based on the weight of the carrier is from 0.03 to 20%, preferably 0.3 to 13.3%.

If the sulfur content calculated as the radical is of the order of 0.3% by weight, the catalytic activity for the removal of nitrogen oxides is notably improved. The catalytic effect may be observed even when the sulfur content of radical is as low as 0.03% by weight. When the concentration appreciably exceeds 20% by weight, however, the catalyst which utilizes it does not afford any higher conversion of nitrogen oxides than conventional catalysts which do not contain sulfate and/or sulfite radicals.

A wide variety of metalic salts can be used to prepare the catalysts of this invention, including those used with conventional catalysts in which the carrier is free of sulfate or sulfate radicals. There include salts from metals of the first transition group, especially those from Groups Ib, Vb, VIb, VIIb and VIII. Preferably the metals are from Groups Ib, Vb, VIb and VIII.

The most preferred metal compounds on the carrier are the oxides and sulfates of iron and copper. The salts deposited on the carrier before final calcination may be selected from inorganic salts such as, sulfates, nitrates, carbonates, chlorides and phosphates of any of the above described metals. The salts may also be based on organic cations such as formates, acetates, and oxalates; or they may be complex salts of ammonium acetate or oxalate with the selected metal. In any event the amount of metal on the carrier in the prepared catalyst is generally of the order of from 0.5 to 20%, preferably 1 to 10% based on the weight of the carrier; as calculated by the following formula:

$$\frac{\text{Weight of metal}}{\text{Weight of carrier and radical}} \times 100$$

The activity of the catalyst generally increases with increasing amounts of metal. However, if the amount appreciably exceeds 20%, the modest increase in activity does not justify the added difficulty in preparation.

The salts are deposited on the carrier in accordance with known methods. Examples of such methods include the impregnation method which comprises impregnating a molded carrier with an aqueous solution of one or more salts of active metals, and the kneading method which comprises adding a mixture of powdered alumina or silica-alumina together carrier with one or more salts of active metals to water, adjusting the resultant aqueous mixture in pH value and temperature, kneading the mixture and molding the kneaded mixture to a required shape.

The mixture thus produced is then dried at 100°–150° C for 0.5 to 24 hours and calcined in a stream of air at 300° to 600° C for 1 to 10 hours to produce the novel catalysts of this invention. The temperature of calcination is normally selected to be slightly higher than the temperature at which the catalysts will be employed in treating waste gases.

The waste gases which may be effectively treated according to this invention include the gases released from boilers, heating furnaces, combustion furnaces, calciners, incinerators, chemical processing plants, and the like. The waste gases generated in the fuel combustion facilities generally contain 10–10,000 ppm of NOx, 10–5,000 ppm of SOx, 0.5–20% by volume of $O_2$ and not more than 50% by volume of $H_2O$.

The quantity of SOx contained in the waste gas depends on the sulfur content in the fuel. A typical waste gas from industrial equipment contains 100 to 3,000 ppm SOx (both $SO_2$ and $SO_3$). The amount of NOx which it will contain depends on the nitrogen content in the fuel, the combustion temperatures and other factors.

The process using the catalysts according to the present invention can be effectively conducted in fixed-bed type or fluidized-bed type reactors or in other types of reactors such as the honeycomb type reactors which are specifically designed to repress possible pressure drop.

The treatmemnt of the waste gas using the improved catalyst of this invention is normally carried out at from 250° to 550° C at a molar ratio of $NH_3$ to NOx of from 0.8 to 1.5, preferably 1.0 to 1.2.

The catalysts of this invention prepared under the conditions specified above have many advantages.

In the first place, they exhibit high activity for the removal of NOx. Additionally, they retain the high activity for a long period of time, because the carrier is highly resistant to the SOx in the waste gas. Due to this the physical properties, particularly pore volume and surface area, do not deteriorate.

Moreover, the catalysts are selective with respect to the oxygen coexisting in the waste gas in a wider range of temperatures than the conventional catalyst made of metal oxide. As a result, the range of operation temperatures at which high conversion of NOx is obtained is wider and the allowance for possible change in the reaction temperatures is likewise greater. Thus, the operation can be stably performed without having to keep the reactor under rigidly controlled temperature conditions. This appreciably reduces the costs of operation.

Moreover, since the catalysts are resistant to SOx as described above, the process for removal of NOx can be integrated in the overall process either before or after the removal of SOx.

The following non-limiting examples are given by way of illustration only.

EXAMPLE 1

1. An alumina carrier containing 10.3 wt% of sulfate radical was prepared as described below.

To 1350 liters of deionized water, 76.5 kg of an aqueous sodium aluminate solution containing 18 wt% of sodium as $Na_2O$ and 22 wt% of aluminum as $Al_2O_3$ was added. To the resultant mixture was added 280 kg of an aqueous 8.4 wt% aluminum sulfate solution. The product thus prepared was a suspension of hydrated alumina containing 1.4 wt% of $Al_2O_3$. The liquid was fed to and dehydrated by a centrifugal separator until it was concentrated to 8.2 wt% of $Al_2O_3$. The concentrated liquid was formed into fine particles in a spray drier of the pressure nozzle type, then re-suspended in deionized water. The suspension was filtered in an Oliver filter and washed with deionized water until the residue retained the prescribed amount of sulfate radical. It was then dried in a drier to prepare particles of alumina having an $Al_2O_3$ content of 68 wt%.

In a kneader having an inner volume of 10 liters, 8 kg of the thus prepared alumina were kneaded with a suitable amount of deionized water for 1 hour to produce a kneaded mass having the degree of plasticity suitable for extrusion. This mass was fed into an extruder and extruded in the shape of cylinders through 2-mm dies. The pellets thus obtained were dried at 110° C for 16 hours and then calcined in a stream of air at 550° C for 3 hours. The cylindrical alumina consequently obtained had a specific surface area of 250 m²/g and a pore volume of 0.68 cc/g and the sulfur content calculated as a sulfate radical was wt% based on the carrier substance.

2. The various salts of active metals indicated below were supported on the alumina carrier containing 3.4 wt% of sulfur radical prepared as described above.

(1) In a beaker, 1 kg of the carrier was placed and 1.05 liters of a 27.7 wt% aqueous ferric ammonium oxalate solution was gradually added dropwise so that the carrier absorbed the aqueous solution uniformly throughout.

The carrier thus impregnated with said aqueous solution of iron salt was immediately dried at 100°–120° C for 3 hours and then calcined in a stream of air at 550° C for 3 hours. to prepare a catalyst A.

(2) Similarly, 1 kg of the carrier was placed in a beaker and 1.05 liters of a 14.5 wt% aqueous cupric nitrate solution was added dropwise. The impregnated carrier was dried and calcined to prepare catalyst B.

(3) Similarly, 1 kg of the carrier was placed in a beaker and 1.05 liters of a 28.7 wt% aqueous chromic nitrate solution was added dropwise, and the impregnated carrier was dried and calcined to prepare catalyst C.

(4) Similarly, 1 kg of the carrier was placed in a beaker and 1.05 liters of a 15.1 wt% aqueous cobalt nitrate solution was added dropwise, and the impregnated carrier was dried and calcined to prepared catalyst D.

(5) Similarly, 1 kg of the carrier was placed in a beaker and 1.05 liters of a 15.1 wt% aqueous nickel nitrate solution was added dropwise, and the impregnated carrier was dried and calcined to prepare catalyst E.

(6) Similarly, 1 kg of the carrier was placed in a beaker and 1.05 liters of a 12.1 wt% aqueous vanadyl oxalate solution was added dropwise, and the impregnated carrier was dried and calcined to prepare catalyst F.

In each of the catalysts obtained as described above, the amount of metal salt supported on the carrier was invariably 6.0 wt% based on the carrier substance.

Six reactors measuring 20 mm in inside diameter and 500 mm in overall length were used. The reactor consisted of a preheating zone and a catalyst bed and was kept at a prescribed temperature by means of an electric heater. These reactors were packed with 10-ml of catalyst.

A simulated gas consisting of 200 ppm of NO, 220 ppm of $NH_3$, 1500 ppm of $SO_2$, 3 vol% of $O_2$, 10 vol% of $H_2O$ and the balance of $N_2$ was introduced into the reactor at a flow rate of 200 Nl/HR (50 Nl/HR in case of the catalysts D and E), at varying temperatures. The treated gas was sampled at the reactor outlet and analyzed for NO concentration to calculate the conversion of NOx. The results are shown in FIG. 1 from which the high activity of the catalysts of the invention is evident.

EXAMPLE 2

1. A silica-alumina carrier containing 6.3 wt% of sulfur calculated sulfate radical was prepared as described below.

A total of 75 liters of deionized water was used to dilute 24.8 kg of a commercially available sodium silicate, containing 29 wt% of $SiO_2$. The diluted solution was mixed with 25 wt% sulfuric acid under agitation to prepare a hydrogel of silica. To the suspended hydrogel of silica, 28 kg of a 24 wt% aqueous aluminum sulfate solution was added.

To the resultant mixed solution having a pH value of 2.7, 28 wt% aqueous ammonia solution was added in an amount to adjust the pH value to 5.5, and to form a hydrogen of silica-alumina.

The hydrogel of silica-alumina was dehydrated in a centrifugal separator until there a viscous gel having a silica-alumina content of 8 wt% was obtained. The gel was kneaded in a homogenizer and then formed into fine particles by use of a spray drier of the pressure nozzle type. The particles were suspended in deionized water and the suspension was fed to Oliver filter and washed with deionized water in such manner that the residue after washing retained the desired amount of sulfate radical. 8-kg of the resultant washed cake was fed to a kneader having an inner volume of 10 liters and kneaded continuously until the cake assumed plasticity. The kneaded silica-alumina hydrate was fed into an extruder provided with dies 1.3 mm in diameter and extruded in the shape of cylinders 1.3 mm in diameter. The pellets thus obtained were then dried at 110° C for 16 hours and thereafter calcined in a stream of air at 550° C for 3 hours. The resulting carrier had a specific surface area of 425 $m^2$/g and a pore volume of 0.80 cc/g. Chemical analysis showed that the ratio of silicon to aluminum was 1.0:0.46 and the sulfur content as a sulfate radical was 6.3 wt% based on the weight of the carrier.

2. By following the procedure of Example 1, various salts of active metals were supported on the silica-alumina carrier having a sulfur content calculated as a sulfate radical of 6.3 wt% prepared in 1. above. The catalysts products were catalyst G by impregnating an aqueous ferric ammonium oxalate solution on the carrier, catalyst H by impregnating an aqueous cupric nitrate solution, catalyst I by impregnating an aqueous chromium nitrate solution, a catalyst J by impregnating an aqueous cobalt nitrate solution, a catalyst K by impregnating an aqueous nickel nitrate solution, and a catalyst L by impregnating an aqueous vanadyl oxalate solution. Each catalyst was dried for 3 hours and then calcined in a curent of air at 550° C for 3 hours. The amount of metal in each catalyst was 6.0 wt% based on the weight of the carrier.

3. Catalysts G through L were tested for removal of NOx following the procedure of Example 1. The reaction conditions were identical with those employed in Example 1, except that the flow rate of the gas was 50 Nl/HR. The results were as shown in FIG. 1 from which it will be observed that catalytic activity was substantially the same as that observed with the catalysts of Example 1.

EXAMPLE 3

1. Cylindrical silica-alumina carrier having a specific surface area of 399 $m^2$/g, a pore volume of 1.05 cc/g and a silicon-aluminum ratio of 1.0:0.46, supporting sulfate and sulfite radicals at varying concentrations were prepared as follows.

(1) In a beaker, 1 kg of silica-alumina carrier was placed and 1.05 liters of a 1.3 wt% aqueous ammonium sulfite solution was gradually added dropwise so that the carrier could absorb the aqueous solution uniformly throughout. Subsequently, the impregnated carrier was dried at 110° C for 3 hours and then calcined in a stream of air at 300° C for 3 hours. In this case, the concentration of sulfur calculated as a sulfate radical supported on the carrier was 0.3 wt% based on the weight of the carrier.

(2) In a beaker, 1 kg of silica-alumina carrier was placed and 1.05 liters of a 14 wt% aqueous ammonium sulfite solution was similarly added. The impregnated carrier was dried at 110° for 3 hours and then calcined in a stream of air at 300° C for 3 hours. In this case, the concentration of sulfur calculated as a sulfite radical supported on the carrier was 3.3 wt% based on the weight of the carrier.

(3) By following the procedure of (1) above, carriers having sulfur contents calculated as a sulfate radical supported at concentrations of 0.8, 1.7, 3.3, 6.6, 13.2, 19.8 and 26.4 wt% based on the weight of the carrier were obtained by appropriately varying the concentration of ammonium sulfate in the aqueous solution.

2. A fixed amount of an aqueous solution containing a fixed amount of ferric ammonium oxalate was supported on a silica-alumina carriers having a sulfur content calculated as a sulfate radical of 0.3, 0.8. 1.7, 3.3, 6.6, 13.2, 19.8 and 26.4 wt% and on a silica-alumina carrier containing sulfur calculated as a sulfite radical at a concentration of 4 wt% which had been prepared by the procedure of 1. above. The products thus produced were dried and calcined by the same method as in Example 1 to produce catalysts $M_1$, $M_2$, $M_3$, $M_4$, $M_5$, $M_6$, $M_7$, and N. The amounts of iron supported on the catalysts $M_1$ through $M_7$ and the catalyst N were 6.0 wt% based on the weight of the carrier. For the purpose of comparison, a catalyst $M_1'$ having ferric ammonium oxalate supported at a concentration of 6.0 wt% as iron based on the weight of the carrier on a silica-alumina carrier containing neither sulfate radical nor sulfite radical, and a catalyst $M_2'$ having ferric ammonium oxalate supported at a concentration of 6.0 wt% as iron based on the carrier substance on an γ-alumina carrier containing neither sulfate radical nor sulfite radical were prepared.

Figure 2:
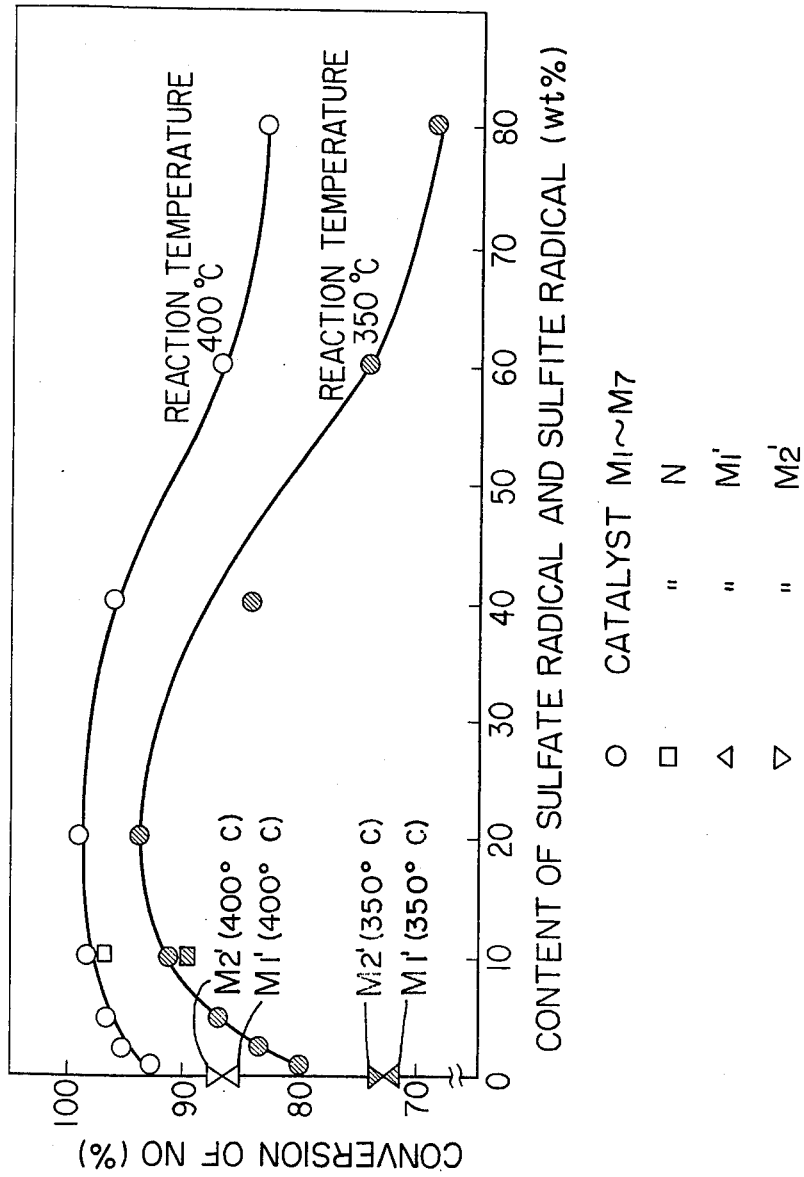

3. The catalysts $M_1$ through $M_7$, the catalyst N and the catalysts $M_1'$ and $M_2'$ prepared as described above were tested for removal of NOx by following the procedure of Example 1, except that the reaction temperatures were 350° C and 400° C. The results were as summarized in FIG. 2.

The data indicate that the catalysts containing sulfur calculated as a sulfate radical or sulfite radical at concentrations of from 0.03 to 20 wt% invariably showed satisfactory results in conversion of NOx and that the catalysts containing sulfur calculated as a said radicals at concentrations of from 0.3 to 13.3 wt% showed the optimum results.

EXAMPLE 4

1. The washed cake obtained in the procedure of Example 2 was washed with a 2 wt% aqueous ammonia solution to ensure more effective alkali washing. Thereafter, the cake was molded in the same manner as already described. The concentration of sulfur calculated as a sulfate radical in the molded carrier was found to be 2.24 wt% based on the weight of the carrier. This carrier was substantially identical with the carrier of Example 2 in respect of the other properties.

2. Various salts of active metals were supported on the carrier by the procedures described below.

(1) 1 kg of the carrier was impregnated with a total of 1.05 liters of an 11.5 wt% aqueous ferrous chloride solution.

(2) Similarly, 1 kg of the carrier was impregnated with a total of 1.05 liters of a 14.2 wt% aqueous ferric chloride solution.

(3) Similarly, 1 kg of the carrier was impregnated with 1.05 liters of a 27.6 wt% aqueous ferric ammonium oxalate solution.

(4) Similarly, 1 kg of the carrier was impregnated with 1.05 liters of a 19.8 wt% aqueous ferric nitrate solution.

(5) Similarly, 1 kg of the carrier was impregnated with 1.05 liters of a 15.1 wt% aqueous ferrous acetate solution.

(6) Similarly, 1 kg of the carrier was impregnated with 1.05 liters of a 15.5 wt% aqueous ferrous sulfate solution.

(7) Similarly, 1 kg of the carrier was impregnated with 1.05 liters of a 14.3 wt% aqueous cupric sulfate solution.

(8) The washed cake of Example 2 was washed with a 2 wt% aqueous solution so that the resultant cake retained 6.72 wt% of sulfate radical. This cake was mixed with 172 g of ferric phosphate, blended thoroughly and molded.

The catalysts obtained as described above were each dried at 110° C for 3 hours and then calcined in a stream of air at 550° for 3 hours, to prepare catalysts O, P, Q, R, S, T, U and V.

The contents of iron or copper of the calalysts O through V were 6.0 wt% based on the weight of the carrier.

Figure 3:
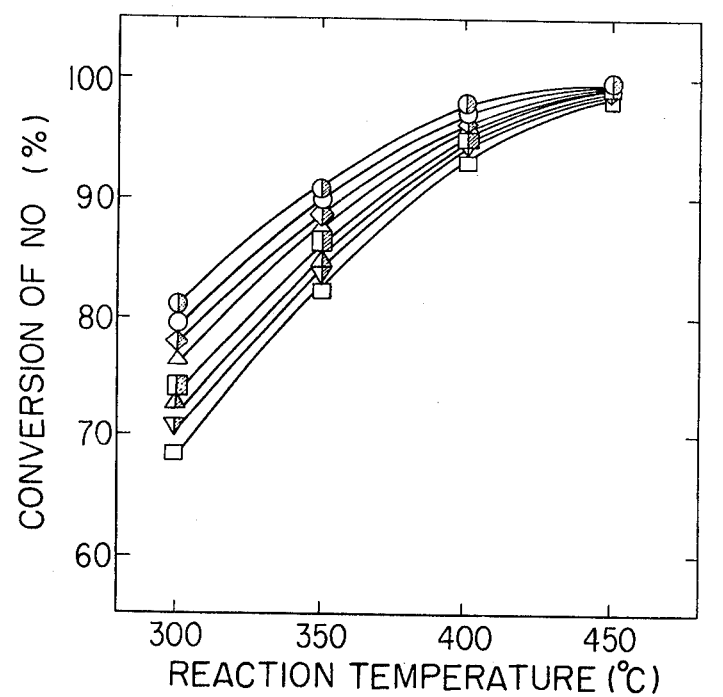

3. By using the same reaction apparatus and the same reaction conditions as those involved in Example 1, the catalysts were tested for removal of NOx. The results were as shown in FIG. 3.

From the data it is seen that the catalysts O through V invariably exhibited satisfactory results for the conversion of NOx and that, therefore, all these catalysts had high catalytic activity without reference to the kinds of salts of active metals used.

EXAMPLE 5

1. The various salts of active metals indicated herein below were supported on the alumina carrier containing 3.4 wt%, sulfur based on the weight of the carrier, calculated as a sulfate radical prepared as in Example 1, to produce binary metal catalysts.

(1) In a beaker, 1 kg of the carrier was placed. An aqueous solution containing 13.9 wt% of ferric ammonium oxalate and another aqueous solution containing 7.3 wt% of cupric nitrate were gradually added dropwise. The total amount of each solution added was 1.05 liters. The carrier thus impregnated with the aqueous solutions of iron and copper salts was immediately dried at 100°–120° C for 3 hours and thereafter calcined in a stream of air at 550° C for 3 hours, to prepare a catalyst W. The amounts of iron and copper supported on the carrier were 3.0 wt% each based on the weight of the carrier.

(2) As in (1) above, 1 kg of the carrier was placed in a beaker and an aqueous solution containing 13.9 wt% of ferric ammonium oxalate and another aqueous solution containing 14.4 wt% of chromic nitrate were added dropwise, each in an amount of 1.05 liters. The impregnated carrier thus obtained was dried and calcined as above to prepare a catalyst X. The amounts of iron and chromium supported on the carrier were 3.0 wt% each based on the weight of the carrier.

2. By using the same reaction apparatus and the same reaction conditions as in Example 1, catalysts W and X were tested for conversion of NOx. The results are shown in Table 1.

Table 1

Results of test of binary metal catalysts for conversion of NOx

| Catalyst | Reaction temperature (° C) Conversion of NO (%) | | | |
|---|---|---|---|---|
| | 300 | 350 | 400 | 450 |
| W | 93.2 | 96.5 | 99.7 | 99.9 |
| X | 93.5 | 97.0 | 99.8 | 99.9 |

It is evident from Table 1 that the binary metal catalysts described above are satisfactory for the conversion of NOx.

EXAMPLE 6

The catalysts A, G, H, T and $M_1'$ prepared as described above and a catalyst Y prepared by causing a commercially available $\gamma$-$Al_2O_3$ containing neither sulfate radical nor sulfite radical to be impregnated with an aqueous solution of ferrous sulfate in an amount to give a concentration of 6 wt% as iron based on the carrier substance were subjected to a life test for catalytic activity in the removal of NOx, using a simulated gas. The reaction apparatus and the feed gas used were identical with those indicated in Example 1. The conversion of NO was observed at 400° C, with the flow rate of gas fixed at 200 Nl/HR. The results are shown in Table 2.

Table 2

| Catalyst | Reaction time (hours) Conversion of NO (%) | | | | |
|---|---|---|---|---|---|
| | 5 | 50 | 100 | 500 | 1000 |
| A | 99.0 | 98.2 | 98.0 | 97.3 | 97.3 |
| G | 98.3 | 98.1 | 98.0 | 97.7 | 97.6 |
| H | 96.0 | 95.4 | 95.0 | 94.7 | 94.8 |
| T | 98.8 | 98.2 | 98.1 | 98.1 | 97.8 |
| $M_1'$ | 84.5 | 82.0 | 80.9 | 77.5 | 75.2 |
| Y | 95.1 | 94.9 | 91.2 | 86.3 | 70.5 |

The improved reaction life of the catalyst of the invention is readily observable from the results recorded in Table 2.

What is claimed is:

1. In a method for the preparation of a catalyst for the reduction of nitrogen oxides in waste gases utilizing ammonium as the reducing agent;

said catalyst comprising an alumina or silica-alumina type carrier supporting a compound or mixture of compounds selected from the group consisting of oxides, sulfates and phosphates of a first transition metal of the Periodic Table;

which method comprises supporting at least one salt of a first transition metal of the periodic table on said carrier, drying at 100° C to 150° C and threafter calcining at 300° C to 600° C to form said compound or mixture of compounds;

the improvement which comprises preparing the carrier by adding powdered alumina or powdered silica-alumina to an aqueous solution containing a reagent selected from the group consisting of aluminum sulfate, sulfuric acid, ammonium sulfate, and ammonium sulfite and thereafter kneading, molding and drying the mixture at 100° C to 150° C followed by calcination at 300° C to 600° C;

thereby to produce a carrier containing from 0.03 to 20% by weight sulfur, based on the weight of the carrier when calculated as a sulfate or sulfite radical, and having a specific surface area of at least 50 $m^2/g$ and a pore volume of from 0.5 to 1.5 cc/g.

2. In a method for the preparation of a catalyst for the reduction of nitrogen oxides in waste gases utilizing ammonia as the reducing agent;

said catalyst comprising an alumina or silica-alumina type carrier supporting a compound or mixture of compounds selected from the group consisting of oxides, sulfates and phosphates of a first transition metal of the Periodic Table;

which method comprises supporting at least one salt of a first transition metal of the periodic table on said carrier, drying at 100° C to 150° C and thereafter calcining at 300° C to 600° C to form said compound or mixture of compounds;

the improvement which comprises preparing said carrier by adding to an aqueous solution of sodium aluminate an aqueous solution of a compound selected from the group consisting of aluminum sulfate, sulfuric acid, ammonium sulfate, ammonium sulfite and mixtures thereof;

thereby to form a hydrogel of alumina, and thereafter sequentially performing the steps of:

1. dehydrating and drying the hydrogel to form fine particles,
2. suspending the particles in water, filtering and washing, and
3. drying the washed particles at 100° C to 150° C and calcining at 300° C to 600° C;

thereby to produce a carrier containing from 0.03 to 20% by weight sulfur, based on the weight of the carrier when calculated as a sulfate or sulfite radical, and having a specific surface area of at least 50 $m^2/g$ and a pore volume of from 0.5 to 1.5 cc/g.

3. In a method for the preparation of a catalyst for the reduction of nitrogen oxides in waste gases utilizing ammonia as the reducing agent;

said catalyst comprising an alumina or silica-alumina type carrier supporting a compound or mixture of compounds selected from the group consisting of oxides, sulfates and phosphates of a first transition metal of the Periodic Tables;

which method comprises supporting at least one salt of a first transition metal of the periodic table on said carrier, drying at 100° C to 150° C and thereafter calcining at 300° C to 600° C to form said compound or mixture of compounds;

the improvement which comprises preparing the carrier by impregnating it by soaking in an aqueous solution of a compound selected from the group consisting of aluminum sulfate, sulfuric acid, ammonium sulfate, ammonium sulfite and mixtures thereof, and thereafter drying the impregnated carrier and calcining it at from 300° C to 600° C;

thereby to produce a carrier containing from 0.03 to 20% by weight sulfur, based on the weight of the carrier when calculated as a sulfate or sulfite radical, and having a specific surface area of at least 50 $m^2/g$ and a pore volume of from 0.5 to 1.5 cc/g.

4. A method as in claim 1 wherein the carrier is prepared by the steps of:

1. adding sulfuric acid to an aqueous solution of sodium silicate to form a hydrogel of silica,
2. adding a reagent selected from the group consisting of an aqueous solution of aluminum sulfate and an aqueous solution of sodium aluminate together with an aqueous solution selected from the group consisting of sulfuric acid, ammonium sulfate, ammonium sulfite and mixtures thereof, 3. adding aqueous ammonia to form a hydrogel of silica-alumina, 4. dehydrating, drying to produce fine particles, suspending the particles in water, filtering and washing, 5. drying at 100° C to 150° C and calcining at from 300° to 600° C.

5. A method as in claim 1, wherein said salt of a first transition metal of the Periodic Table is selected from the group consisting of nitrates, carbonates, chlorides, sulfates, and phosphates.

6. A method as in claim 1, wherein said salt of a first transition metal of the Periodic Table is selected from the group consisting of formates, acetates and oxalates.

7. A method as in claim 1, wherein said salt of a first transition metal of the Periodic Table is selected from the group consisting of ammonium acetate complex salts and ammonium oxalate complex salts.

8. A product prepared by the method of claim 1.
9. A product prepared by the method of claim 2.
10. A product prepared by the method of claim 3.
11. A product prepared by the method of claim 4.
12. A product prepared by the method of claim 5.
13. A product prepared by the method of claim 6.
14. A product prepared by the method of claim 7.

* * * * *